(12) United States Patent
Ikegami (10) Patent No.: US 9,262,043 B2
(45) Date of Patent: Feb. 16, 2016

(54) DISPLAY PROCESSING SYSTEM, DISPLAY PROCESSING METHOD, AND PROGRAM

(75) Inventor: Teruya Ikegami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 13/820,382

(22) PCT Filed: Aug. 30, 2011

(86) PCT No.: PCT/JP2011/004838
§ 371 (c)(1),
(2), (4) Date: Mar. 1, 2013

(87) PCT Pub. No.: WO2012/029290
PCT Pub. Date: Mar. 8, 2012

(65) Prior Publication Data
US 2013/0166744 A1    Jun. 27, 2013

(30) Foreign Application Priority Data

Sep. 3, 2010   (JP) ................................ 2010-197761

(51) Int. Cl.
*G06F 17/30* (2006.01)
*G06F 3/0481* (2013.01)
*H04L 12/26* (2006.01)

(52) U.S. Cl.
CPC .............. *G06F 3/0481* (2013.01); *H04L 12/26* (2013.01); *H04L 43/00* (2013.01)

(58) Field of Classification Search
CPC ................ H04L 43/00; H04L 43/08–43/0876; H04L 43/022; H04L 43/045; H04L 43/065; H04L 12/26; G06F 3/048; G06F 3/0481; G06F 3/0484; G06F 3/0487
USPC .......................... 709/224, 220, 228; 707/741
See application file for complete search history.

(56) References Cited

U.S. PATENT DOCUMENTS

| 6,502,132 B1 * | 12/2002 | Kumano et al. ............... 709/224 |
| 2013/0007262 A1 * | 1/2013 | Akatoki et al. ............... 709/224 |
| 2013/0117275 A1 * | 5/2013 | Yoshida .................. G06F 11/32 707/741 |

FOREIGN PATENT DOCUMENTS

| JP | 60-262694 A | 12/1985 |
| JP | 7-307695 A | 11/1995 |
| JP | 8-129413 A | 5/1996 |
| JP | 2004-164460 A | 6/2004 |

OTHER PUBLICATIONS

International Search Report (PCT/ISA/210) dated Nov. 29, 2011, issued by the International Searching Authority in counterpart International Patent Application No. PCT/JP2011/004838.

* cited by examiner

*Primary Examiner* — Khanh Dinh
(74) *Attorney, Agent, or Firm* — Sughrue Mion, PLLC

(57) ABSTRACT

A display processing system (1) includes: a state display unit (102) which displays a state of a monitoring target; an emphasis display unit (106) which emphasizes and displays difference of change when there is the change in the state of the monitoring target; and a display control unit (108) which changes, after a predetermined period of time passes, the emphasized display by the emphasis display unit (106) back to display of the state of the monitoring target by the state display unit (102).

7 Claims, 7 Drawing Sheets

DISPLAY PROCESSING SYSTEM, DISPLAY PROCESSING METHOD, AND PROGRAM

CROSS REFERENCE TO RELATED APPLICATIONS

This application is a National Stage of International Application No. PCT/JP2011/004838 filed Aug. 30, 2011, claiming priority based on Japanese Patent Application No. 2010-197761, filed Sep. 3, 2010, the contents of all of which are incorporated herein by reference in their entirety.

TECHNICAL FIELD

The present invention relates to a display processing system, a display processing method, and a program, and more particularly, to a display processing system, a display processing method, and a program for displaying management information about a system.

BACKGROUND ART

In recent years, as computers are incorporated into clouds, and at data centers and the like, the enlarged scales and complexity of the information technology (IT) device and services are accelerated. Under such background, how to efficiently manage operation of a system and how to ensure the reliability are an important issue.

Patent document 1 describes an example of a process monitoring device for converting process data into graph data representing time-change and displaying the graph data. The process monitoring device described in patent document 1 has an enlarged graph display unit which subtracts a reference line value from process data, multiplies a magnification rate, and displays amplified graph data.

Patent document 2 describes an example of a graph generating machine having enlarging function. The graph generating machine having enlarging function described in patent document 2 calculates a rate of a difference of the maximum value and the minimum value in data with respect to the maximum value, make comparison with a setting value, and when the difference rate value is larger, the graph generating machine makes enlargement display.

RELATED DOCUMENT

Patent Document

[Patent document 1] Japanese Unexamined Patent Application Publication No. H8-129413
[Patent document 2] Japanese Unexamined Patent Application Publication No. S60-262694

SUMMARY OF THE INVENTION

The technique described in patent document as described above involves a problem in that, when a large scale monitoring target data are displayed as graph to monitor the entire data, it is impossible to display the data so as to be able to recognize small changes.

The present invention is made in view of the above circumstances, and it is an object of the present invention to provide a display processing system, a display processing method, and a program for improving the efficiency and reliability of system management.

According to the present invention, a display processing system includes: a state display unit which displays a state of a monitoring target; an emphasis display unit which emphasizes and displays difference of change when there is the change in the state of the monitoring target; and a display control unit which changes, after a predetermined period of time passes, the emphasized display by the emphasis display unit back to display of the state of the monitoring target by the state display unit.

According to the present invention, a display processing method to be executed by a processing apparatus having a display unit includes: displaying a state of a monitoring target on the display unit; and when the state of the monitoring target changes, emphasizing and displaying difference of the change; and after a predetermined period of time passes, changing the emphasized display back to display of the state of the monitoring target.

According to the present invention, a program causes a computer having a display unit to perform: a procedure for displaying a state of a monitoring target on the display unit; when the state of the monitoring target changes, a procedure for emphasizing and displaying difference of the change; and after a predetermined period of time passes, a procedure for changing the emphasized display back to display of the state of the monitoring target.

It should be noted that, any combination of the above constituent elements and expression of the present invention converted into a method, an apparatus, a system, a recording medium, a computer program, and the like are also effective as an aspect of the present invention.

Various kinds of constituent elements of the present invention may not necessarily exist independently from each other, and may be in the following manner: a plurality of constituent elements may be formed as one member, one constituent element may be formed with a plurality of members, a certain constituent element may be a part of another constituent element, or a part of a certain constituent element may overlap a part of another constituent element.

Further, the method and the computer program of the present invention are described such that a plurality of procedures are described in order, but the order of the description is not intended to limit the order of execution of a plurality of procedures. Accordingly, when the method and the computer program of the present invention are carried out, the order of a plurality of procedures may be changed within the scope not causing any problem in terms of the contents.

Further, the order of a plurality of procedures of the method and the computer program of the present invention is not limited to execution with timing different from each other. For this reason, for example, another procedure may occur during execution of a certain procedure, and execution timing of a certain procedure may partially or entirely overlap execution timing of another procedure.

According to the present invention, it is possible to provide a display processing system, a display processing method, and a program for improving the efficiency and reliability of system management.

BRIEF DESCRIPTION OF THE DRAWINGS

The aforementioned objects and other objects, features, and advantages will be more apparent from the following preferred exemplary embodiments and the following drawings attached thereto.

DESCRIPTION OF EXEMPLARY EMBODIMENTS

Exemplary embodiments of the present invention will be hereinafter explained with reference to drawings. In all the drawings, the similar reference numerals are attached to the similar constituent elements, and the description thereof will not be repeated as necessary.

Figure 1:
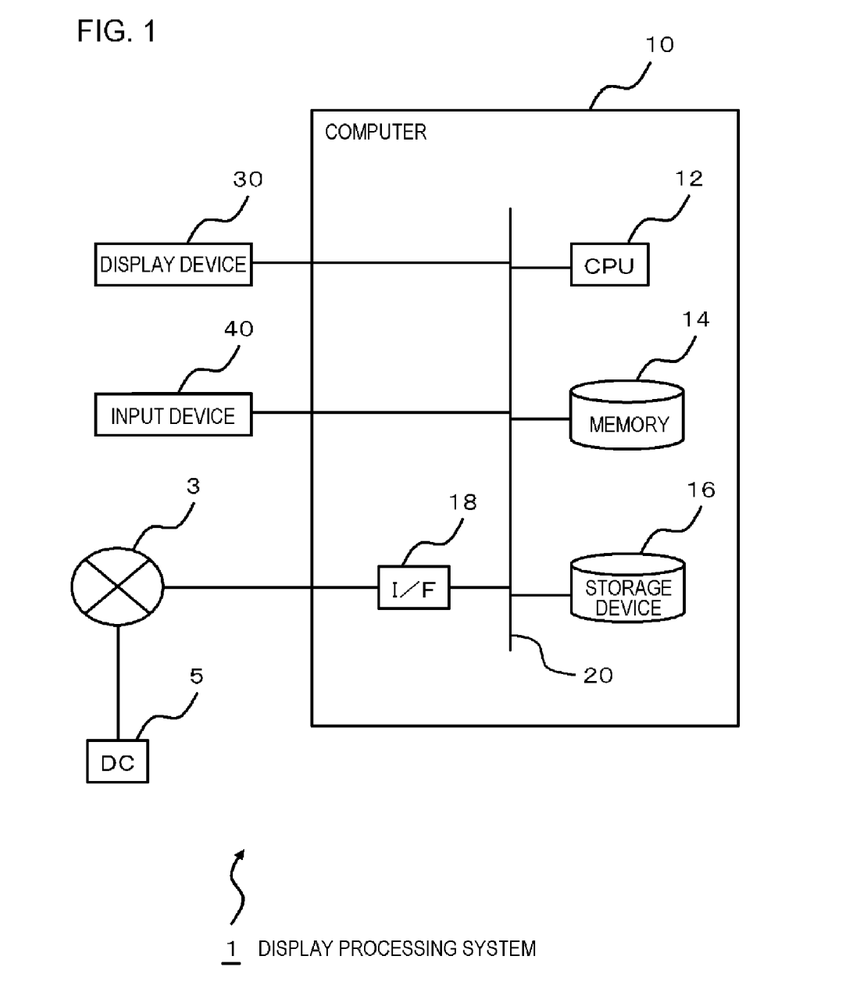
FIG. 1 is a functional block diagram illustrating a configuration of a display processing system according to an exemplary embodiment of the present invention.

FIG. 1 is a block diagram illustrating a configuration of a display processing system 1 according to the exemplary embodiment of the present invention.

For example, the display processing system 1 according to the exemplary embodiment of the present invention presents, to users, information indicating operation management state of many IT devices and services of a data center (DC) 5 connected through a network 3. In the present exemplary embodiment, the user is, for example, an administrator who manages the system of the data center 5, service users, and the like. Further, the administrators include not only the administrator who monitors the system of the data center 5 at all times but also managers and executives who sometimes come to the site to check the state of the system. In particular, the display processing system 1 of the present exemplary embodiment is preferably configured such that the usage states of resources and the like can be determined at a glance when the managers, the executives, and the like of the data center 5 see the screen.

The display processing system 1 includes, for example, a computer 10 including a central processing unit (CPU) 12, a memory 14, a storage device 16 such as a hard disk, and a communication device (interface (I/F) 18 in the drawing). The CPU 12 is connected to each element of the computer 10 through a bus 20, and the CPU 12 as well as each element controls the overall computer 10. The computer 10 of the display processing system 1 can be achieved with a server computer, a personal computer, or a device corresponding thereto which is connected to an input device 40 such as a keyboard or a mouse, a display device 30 such as a display, and an output device such as a printer (not shown). Then, the CPU 12 loads a program stored in the storage device 16 to the memory 14 and executes the program, thus achieving each function of each unit explained below.

In each drawing, a configuration about a portion not related to the essential of the present invention is omitted, and not shown in the drawings.

Figure 2:
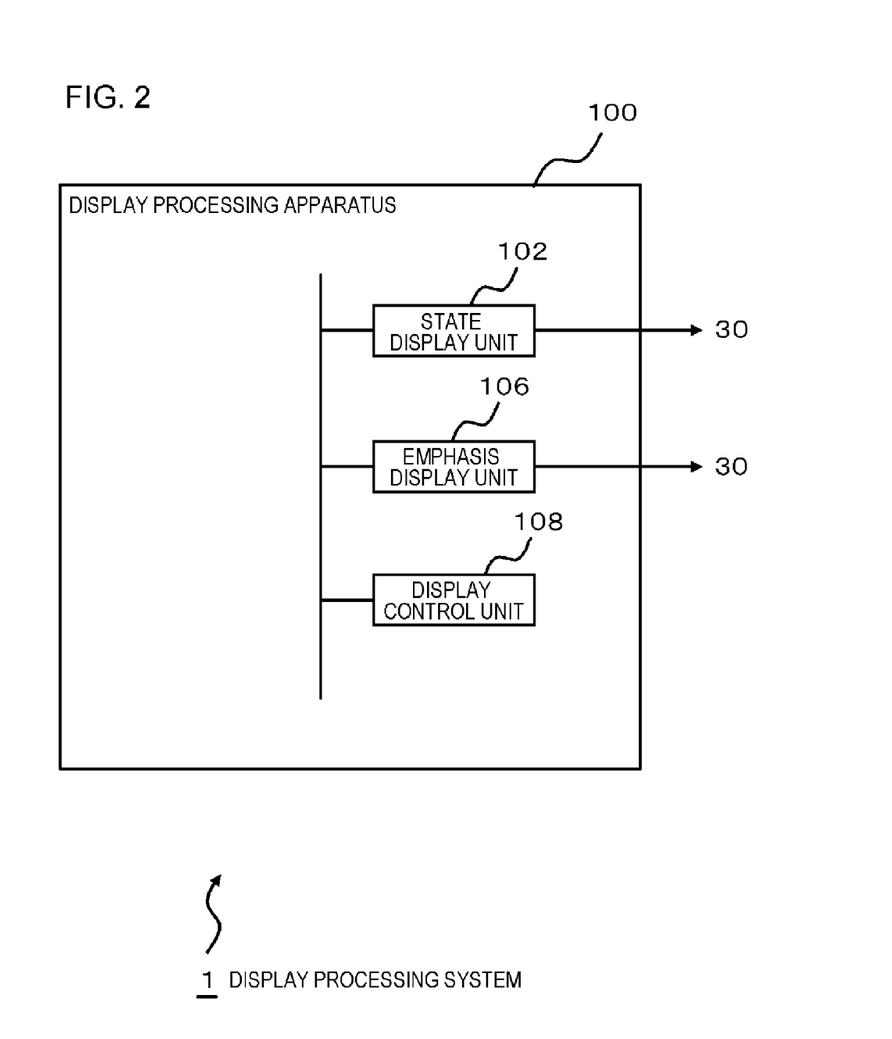
FIG. 2 is a functional block diagram illustrating a configuration of a display processing apparatus of the display processing system according to the exemplary embodiment of the present invention.

FIG. 2 is a functional block diagram illustrating a configuration of a display processing apparatus 100 achieved by a computer 10 of the display processing system 1 according to the exemplary embodiment of the present invention.

As illustrated in FIG. 2, the display processing system 1 according to the present exemplary embodiment includes a state display unit 102 which displays a state of a monitoring target, an emphasis display unit 106 which emphasizes and displays difference of change when change occurs in the state of the monitoring target, and a display control unit 108 which changes the emphasized display by the emphasis display unit 106 back to display of the state of the monitoring target by the state display unit 102 after a predetermined period of time passes.

Each constituent element of the display processing apparatus 100 is achieved with a combination of software and hardware such as the CPU 12, the memory 14, the program achieving constituent elements of this drawing loaded to the memory 14, the storage device 16 such as a hard disk storing the program, and a network connection interface 18, which are provided in the computer 10 (FIG. 1) explained above. Further, a person skilled in the art could understand that various modifications exist for the achieving method and the apparatus. Each drawing explained below is illustrated as blocks in units of functions, not the configuration in units of hardware.

The computer program according to the present exemplary embodiment is described to cause the computer 10 (FIG. 1) for achieving the display processing apparatus 100 of the display processing system 1 to perform: a procedure for displaying the state of the monitoring target on the display device 30 (FIG. 1), a procedure for emphasizing and displaying difference of change on the display device 30 (FIG. 1) when change occurs in the state of the monitoring target, and a procedure for changing the emphasized display back to display of the state of the monitoring target after a predetermined period of time passes.

The computer program according to the present exemplary embodiment may be recorded in a computer-readable recording medium. The recording medium is not particularly limited, and various forms of recording media may be considered. The program may loaded from the recording medium to the memory of the computer, or may be downloaded through a network to the computer, and loaded to the memory.

More specifically, the display processing apparatus 100 includes a state display unit 102, an emphasis display unit 106, and a display control unit 108.

The state display unit 102 displays a screen 130 (FIG. 3) on the display device 30 of the computer 10 (FIG. 1) with predetermined timing. In the screen 130, a graph is drawn to show distribution of the number of monitoring targets with respect to a value representing the state of the monitoring target (value of monitoring item). In this case, the monitoring target is a value representing a state of quality of services and a state of IT devices such as the data center 5, and the total number of monitoring targets is in the order of several thousands to several tens of thousands. The monitoring items may be information useful for allowing a surveyor to know that the system is operating normally, such as a response time (TAT: TurnAround Time) including a service response time and a function response time, a CPU utilization, a memory usage, and a network communication traffic.

The display processing system 1 of the present invention is particularly useful when overall monitoring targets are monitored. Monitoring is preferably done with a regular interval, for example, with a relatively short interval such as every several seconds and several minutes. The data of the monitoring items may be collected with a regular interval through the network 3 from each server (not shown) or management server (not shown). Data may be collected from the server with a regular interval and stored to the memory 14, and the display processing apparatus 100 may use the stored data. Alternatively, the data of the monitoring items may be collected from each server or management server, and may be read and obtained from the recorded recording medium.

Figure 3:
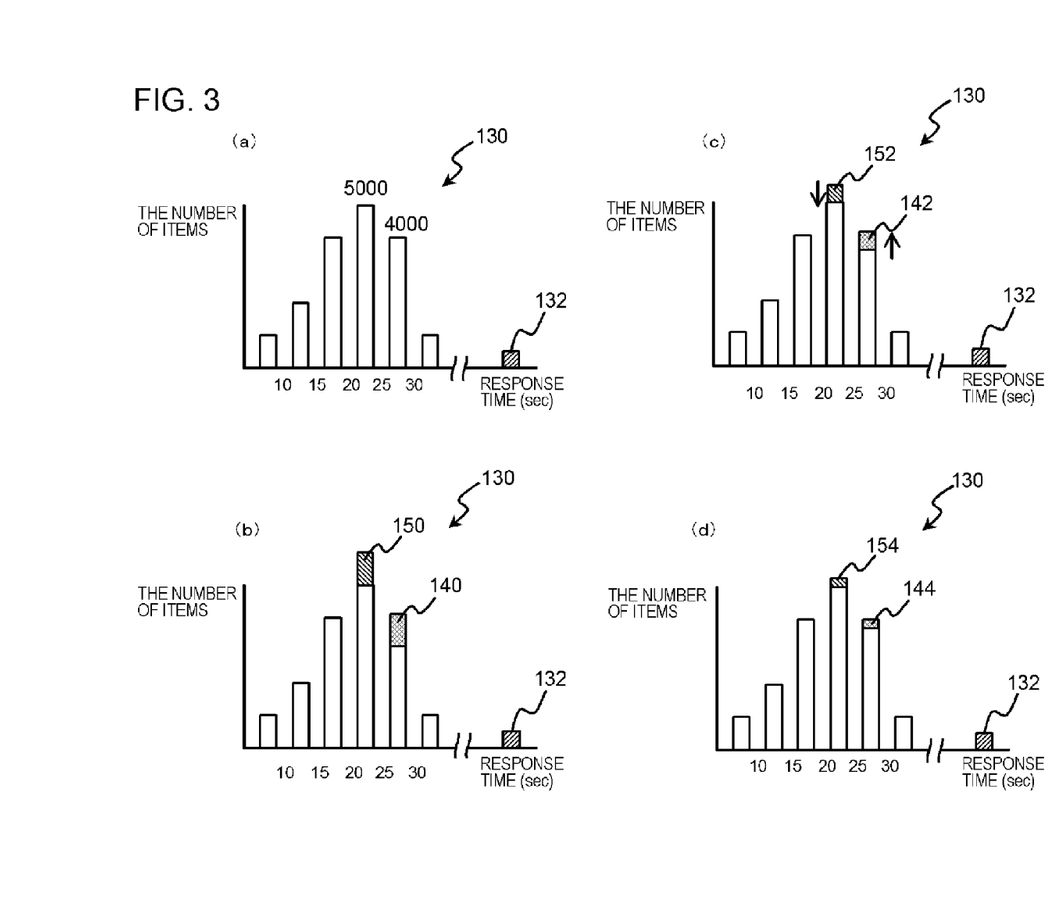
FIG. 3 is a figure illustrating an example of a display screen of the display processing system according to the exemplary embodiment of the present invention.

In the present exemplary embodiment, the value indicating the state such as a CPU utilization and a response time of IT devices and services of monitoring targets is converted into image information and displayed on the screen 130. At this occasion, the value indicating the state is converted into image information in such a form that the user can easily understand as to what kind of distribution is represented in the overall monitoring targets. In the display processing system 1 of the present invention, the value representing the state of the monitoring target is particularly useful when the standard deviation σ is narrow normal distribution. When the system normally operates under normal circumstances, the values of the state of the monitoring target are concentrated into the normal range. In such case, in most cases, such standard deviation σ tends to be narrow normal distribution.

For this reason, for example, when the number of the overall monitoring targets is in the order of several thousands to several tens of thousands, and the difference of change is in the order of several items to several hundreds of items, the change on the graph is very small in terms of the display, and therefore, the surveyor may not be able to observe the change. Therefore, in the present exemplary embodiment, as described later, emphasized display is performed to, for example, display the changed portion in such a manner that they are larger than actual values, so that the change can be recognized.

In the present exemplary embodiment, as illustrated in FIG. 3, the state display may be a bar graph in which the horizontal axis represents the value of the monitoring item, and the vertical axis represents the number of monitoring targets such as IT devices and services having the values. The vertical axis may be a value of a monitoring item, and the bar graph may be long in the horizontal direction indicating the number of items in the horizontal axis. The type of graph is not limited, and it may be achieved as a line graph by moving and displaying a plot position according to similar method. In the present exemplary embodiment, the number of items in the vertical axis is in the order of several thousands to several tens of thousands.

As illustrated in FIG. 3(*a*), in the screen 130, for example, the number of items of IT devices and services are displayed with respect to a response time (second). Most devices and services are included within the range of 20 to 25 seconds, and therefore, the bar graph in the range has significantly high value as compared with the other range. On the other hand, when an error occurs due to failure and the like, and when there is an item of which response time is longer than a predetermined value, an abnormality emphasis display portion 132 is provided at the right end of the graph, and those of which response times are equal to or more than the predetermined value may be displayed together. The abnormality emphasis display portion 132 may use the emphasis display unit 106 explained later to perform emphasized display to show the number of items more than the actual number of items.

The present exemplary embodiment is configured such that the abnormality emphasis display portion 132 is provided for the values of the monitoring items equal to or more than the predetermined value, but the abnormality emphasis display portions may be provided at the left end of the graph, and the values of the monitoring items less than the predetermined threshold value are displayed together.

In the present exemplary embodiment, the value of each monitoring item may be obtained by various methods with various timings. For example, the value of each monitoring item may be included in information stored in the memory 14 obtained in advance by the display processing apparatus 100, and may be included in information received through the network 3 or other recording medium with a regular interval or as necessary.

The monitoring item which is to be displayed may be selected in advance or may be selected and changed as necessary by a user on a setting screen (not shown) from a plurality of monitoring items determined in advance.

When there is change in the state of the monitoring target, the emphasis display unit 106 displays an image emphasizing the difference of change on the display device 30. The emphasis display unit 106 may perform emphasized display by, for example, displaying the graph upon enlarging it to be larger than the width of the graph showing the actual difference of change (length in vertical axis direction), emphasizing the graph by changing the color, displaying the graph blinking, or displaying an icon in proximity to the graph for emphasis.

For example, when the number of the overall monitoring targets is in the order of several thousands to several tens of thousands, and the difference of change is in the order of several items to several hundreds of items, the surveyor may not be able to observe the change in the bar graph as illustrated in FIG. 3(*a*) on the display. Therefore, emphasized display is performed to, for example, display the graph by enlarging the graph such that the change on the graph is larger than the change of the actual value, and the user can recognize the change.

In the emphasized display of the emphasis display unit 106, for example, a change "x" of the distribution may be used to derive the drawing initial value according to a predetermined function f(x) for increasing the difference of the change. The difference of the distribution is difference of change of the graph representing the state of the monitoring target between previous and current monitoring timing (cycle T (second)). The emphasis display unit 106 draws the difference in accordance with the function f(x) on the graph. When the number of items decreases from the state of the previous monitoring timing as illustrated in FIG. 3(*a*), the graph is drawn so that the difference is enlarged and emphasized as compared with the reality in accordance with the function f(x) like a decrement emphasis display portion 140 as illustrated in FIG. 3(*b*), and the graph is drawn as if the number of items decreases as compared with the reality. On the other hand, when the number of items increases from the state of the previous monitoring timing as illustrated in FIG. 3(*b*), the graph is drawn so that the difference is enlarged as compared with the reality in accordance with the function f(x) like an increment emphasis display portion 150 as illustrated in FIG. 3(*b*), and the graph is drawn as if the number of items increases as compared with the reality.

Various processing methods other than the function f(x) may be considered as the method of the emphasized display. For example, the emphasized display may be done using a function for changing the enlargement factor in accordance with the maximum variation during processing. Accordingly, even when the change is very small, the change can be observed without fail. However, in this case, the enlargement factor changes, and therefore, there is no consistency of ratio with the actual number of items indicated in the enlarged portion, and therefore, it is difficult to find the real number of items.

The decrement emphasis display portion 140 and the increment emphasis display portion 150 may emphasize and display the graph drawn on the screen 130 by applying animation processing, changing the color of the graph, or blinking the graph. Alternatively, an icon may be displayed in proximity to the graph for emphasis. For example, an arrow icon may be used. The direction of the arrow may represent increase/decrease, the length or the size of the arrow may represent the amount of change, and the color may represent whether it is abnormal or normal.

After a predetermined period of time passes, the display control unit 108 controls the display device 30 to change the display from the emphasized display by the emphasis display unit 106 back to the screen 130 of the state of the monitoring target by the state display unit 104. In this case, the predetermined period of time can be, for example, a period in which the user can recognize the emphasized display. For example, the display control unit 108 may continuously perform the graph drawing with the decrement emphasis display portion 142 or the increment emphasis display portion 152 so as to gradually change the state of the decrement emphasis display portion 140 or the increment emphasis display portion 150 of FIG. 3(*b*) back to the original value and converge thereto within a predetermined period of time t (second) as illustrated in FIG. 3(*c*). In this case, the predetermined period of time t is less than the monitoring cycle T. The emphasized display may be left as an afterimage. Thereafter, the emphasized display may be performed until the surveyor confirms the change, and after the confirmation, the display may be changed back to the normal display. FIG. 3(*d*) illustrates the state where the display of the difference is changed from the emphasized display back to the original value. Each of the decrement difference display portion 144 and the increment difference display portion 154 displays the difference. In this case, since the difference is small, difference can hardly be seen on the graph.

As described above, in particular, when the value indicating the state of the monitoring target is equal to or more than a predetermined value, and there are "x" abnormal devices, the emphasis display unit 106 may strengthen the degree of emphasis of the number of items "x" in accordance with the function f(x) which is the same as the above, and may display the graph with the abnormality emphasis display portion 132. The abnormality emphasis display portion 132 may further emphasize by, for example, changing the color in red or blinking the display. More specifically, when the value indicated by the state of the monitoring target is out of the normal range, the emphasis display unit 106 may display the graph by strengthening the degree of emphasis as compared with the case within the normal range.

When the value indicated by the state of the monitoring target (hereinafter explained as "response time") is equal to or more than a predetermined value, and the scale of the response time is away, the items may be displayed together at a predetermined position of the right end of the graph. More specifically, when the item is abnormal where the response time is greatly out of the normal range, how much is the response time is not the issue, and it is sufficient to know whether there is an abnormal one or not. The predetermined value and the threshold value for detecting the above abnormality or the enlargement width of the difference by the above function f(x), the emphasis method such as color change, whether or not blinking, icon display, and the like may be respectively stored to the memory 14 of the computer 10 upon receiving the value set with a setting screen (not shown) by a user in advance as setting values.

The display on the screen 130 by the state display unit 102, the emphasis display unit 106, and the display control unit 108 may not be necessarily updated with the same monitoring cycle. The update cycles of the normal display and the emphasized display may not be the same, and the update cycle of the emphasized display may be longer than the normal display. This is because the longer the update cycle is, the easier it becomes for the user to notice the emphasized display.

Operation of the display processing system 1 according to the present exemplary embodiment configured as described above will be explained below.

Figure 4:
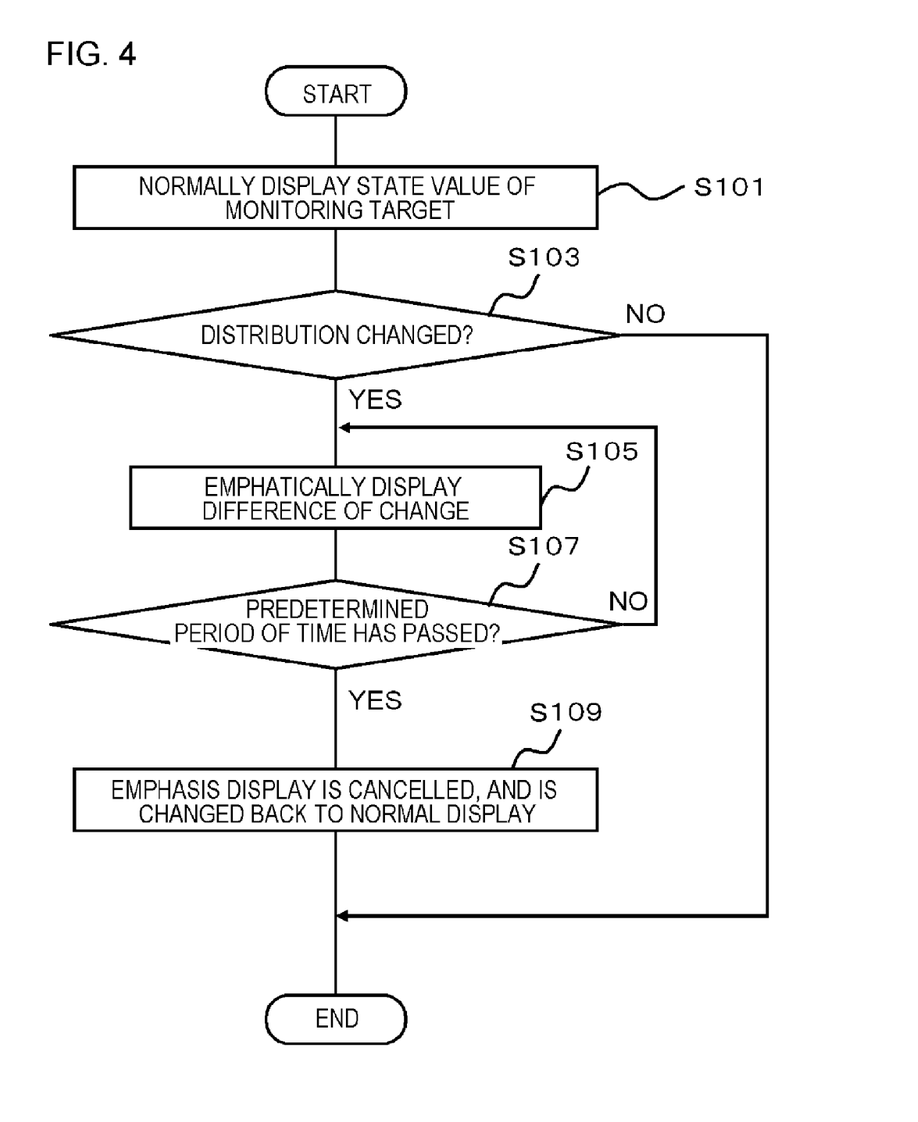
FIG. 4 is a flowchart illustrating an example of operation of the display processing system according to the exemplary embodiment of the present invention.

FIG. 4 is a flowchart illustrating an example of operation of the display processing system 1 according to the present exemplary embodiment. Hereinafter, explanation will be made with reference to FIGS. 1 to 4.

The display processing method according to the present exemplary embodiment to be executed by the display processing apparatus 100 of the display processing system 1 (FIG. 1), and the method includes: displaying the state of the monitoring target on the display device 30 (FIG. 1); when the state of the monitoring target changes, emphasizing and displaying the difference of the change on the display device 30 (FIG. 1); and after a predetermined period of time passes, changing the emphasized display back to the display of the state of the monitoring target.

More specifically, first, in the display processing system 1 according to the present exemplary embodiment, the state display unit 102 of the display processing apparatus 100 (FIG. 2) draws the state value of the monitoring target as a bar graph, and displays it on the screen 130 of the display device 30 (FIG. 3(*a*)) (step S101).

Then, the emphasis display unit 106 of the display processing apparatus 100 (FIG. 2) determines whether there is change in the distribution of the state of the monitoring target (step S103). When the distribution changes (YES in step S103), the emphasis display unit 106 of the display processing apparatus 100 (FIG. 2) draws the bar graph emphasizing the difference of the change, and displays the graph on the screen 130 of the display device 30 (FIG. 3(*b*)) (step S105).

Then, after the predetermined period of time passes (YES in step S107), the display control unit 108 of the display processing apparatus 100 (FIG. 2) stops the emphasized display with the emphasis display unit 106, performs drawing for changing back to the original value, and displays it on the screen 130 of the display device 30 (FIG. 3(*d*)) (step S109). Before the predetermined period of time passes (NO in step S107), step S105 is subsequently performed.

After step S105, the bar graph is drawn so that the emphasized display gradually converges within the predetermined period of time, and the graph is displayed on the screen 130 of the display device 30 (FIG. 3(*c*)), and after the predetermined period of time, the value may be changed back to the original value.

When the distribution does not change in step S103 (NO in step S103), this processing is terminated.

The processing of this flowchart is started with a predetermined cycle, and is repeatedly executed. The processing for updating the normal display in step S101, the processing for updating the emphasized display in step S105, and the processing for cancelling the emphasized display in step S109 may be not necessarily executed with the same cycle.

As described above, according to the display processing system 1 according to the present exemplary embodiment, when the state of the monitoring target is changed, the change is temporarily changed and emphasized, and the surveyor can easily recognize the change, even when the difference of the change on the display cannot be expressed because the width of the change with respect to the entirety is small. When there is no change on the display, the surveyor may feel anxiety as to whether monitoring is actually done or not, but in the present invention, the change of the display can be confirmed visually, and therefore, it is understood that monitoring is done, and this solves the anxiety of the surveyor. Further, the surveyor is less likely to fail to find the change of the state of the monitoring target, and therefore, according to the display processing system 1 of the present invention, the reliability of the system monitoring is improved. When there is no abnormality, the surveyor can find that the operation is normal, and therefore, the survey can rest assured.

As described above, while the surveyor monitors the overall monitoring targets, the surveyor can easily recognize the small change therein, and therefore, the surveyor can notice the problem. Therefore, measures can be quickly taken to solve the problem, and as a result, the efficiency and reliability of the system management are improved.

The exemplary embodiments of the present invention have been hereinabove explained with reference to drawings. However, they are merely examples of the present invention, and various configurations other than the above can also be employed.

Figure 5:
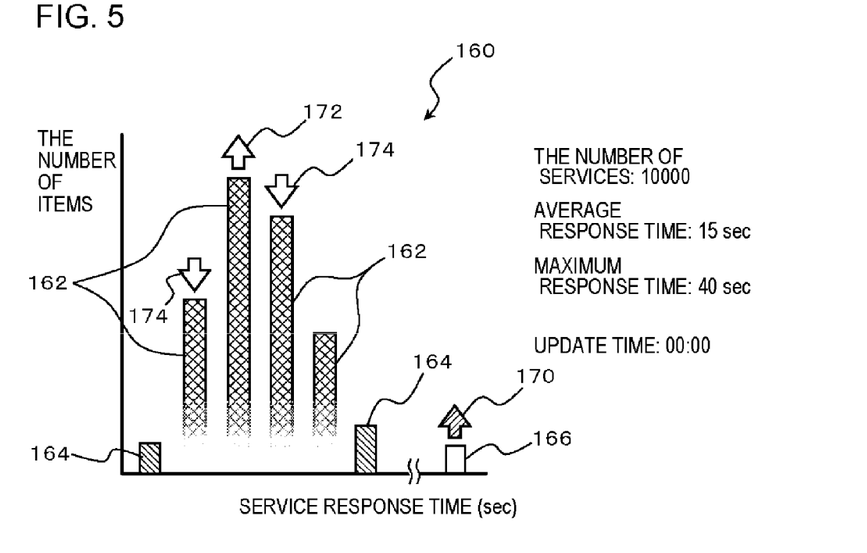
FIG. 5 is a figure illustrating an example of a display screen of the display processing system according to the exemplary embodiment of the present invention.
Figure 6:
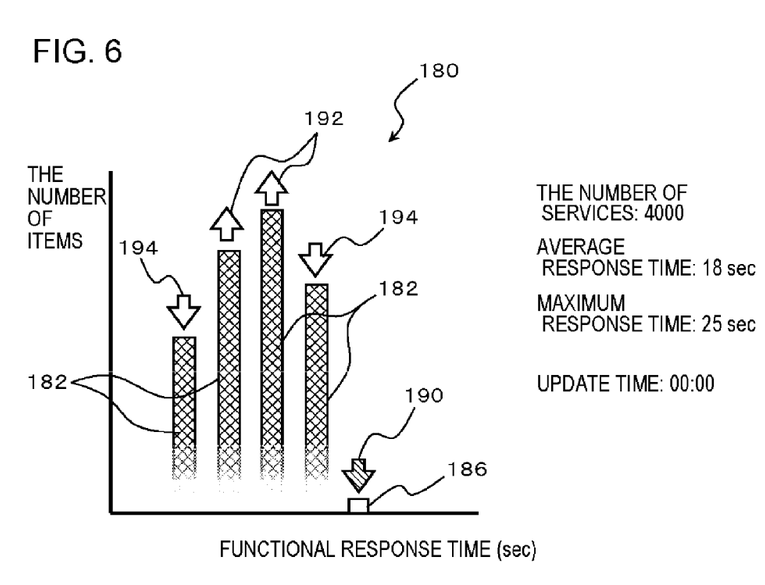
FIG. 6 is a figure illustrating an example of a display screen of the display processing system according to the exemplary embodiment of the present invention.
Figure 7:
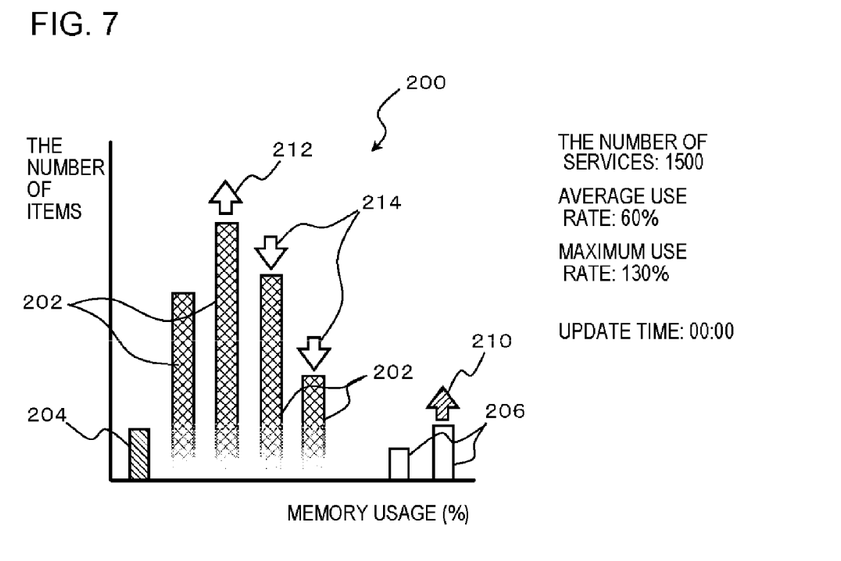
FIG. 7 is a figure illustrating an example of a display screen of the display processing system according to the exemplary embodiment of the present invention.

For example, the graph drawn by the state display unit 102 and the emphasis display unit 106 may be those as illustrated in FIGS. 5 to 7.

As illustrated in FIG. 5, in the screen 160, the number of items of IT devices and services are displayed with respect to a service response time (second).

As illustrated in FIG. 5, in the screen 160, information about the number of services of monitoring targets, the average response time, the maximum response time, and the update time may also be displayed.

For example, it is assumed that a graph 164 is in the order of several dozens, and a graph 162 is in the order of several hundreds to several tens of thousands. In the bar graph 162 where the distribution is concentrated, the bar graph 164 having a small number of items is different in the digit number in the order of the number of items, and therefore, the number of items in the vertical axis is large, which protrudes greatly. Accordingly, in the portion of the graph 162 where the digit number is large, gradation processing is applied to the lower portion, so that it is drawn in a blurred manner, whereby the user can recognize that the scale is different.

When the number of items changes, the emphasis display unit 106 may present the change using arrow icons 172 and 174. The upward arrow icon 172 indicates that the number of items is increasing. The downward arrow icon 174 indicates that the number of items is decreasing. The degree of change may be represented as the size and the color of the arrow icon and the length of the arrow. When the change is more than a predetermined value, the emphasis display unit 106 makes the color in red, a rather large or long arrow, or blinks the display, so that the arrow icons 172 and 174 may be made into emphasized display. When the change is less than the predetermined value, the emphasis display unit 106 may display the arrow icons 172 and 174 by making the color in blue or green or making the arrow smaller or shorter than the above. By doing so, the emphasized display for allowing the surveyor to easily recognize the change is distinguished from the normal display for notifying the normal state to the surveyor, so that the surveyor can find the state at a glance.

Like the above exemplary embodiment, the abnormality emphasis display portion 166 may display them together at the right end. Further, the abnormality emphasis display portion 166 may use an arrow icon 170 to represent the tendency of the change. In FIG. 5, for the upward arrow icon 170, for example, the color of the icon is in red, which indicates that the number of items representing the abnormal service response time is increasing. On the other hand, the downward arrow icon (not shown) may indicate that the number of items indicating the abnormal service response time is decreasing.

As illustrated in FIG. 6, in a screen 180, the number of items of IT devices and services are displayed with respect to a function response time (second).

As illustrated in FIG. 6, in the screen 180, information about the number of services of monitoring targets, the average response time, the maximum response time, and the update time may also be displayed.

Like FIG. 5, a bar graph 182 where the distribution is concentrated is different in the digit number in the order of the number of items from that of a bar graph 186 of which number of items is small. Accordingly, in the portion of the graph 182 where the digit number is large, gradation processing is applied to the lower portion, so that it is drawn in a blurred manner, whereby the user can recognize that the scale is different.

In this case, the graphs 186 represent the number of items of the function response times equal to or more than a predetermined value. The emphasis display unit 106 displays, in the portion of the graphs 186 in an emphasized manner, the number of items of which response times are abnormal values due to failure. In this case, the graph 186 is displayed in a color different from that of the graph 182, for example, in red, and additionally, it may be blinked. In FIG. 6, a downward arrow icon 190 indicates that the number of items representing the abnormal function response time is decreasing. The tendency of the change of the graph 182 is the same as that in FIG. 5, and may be presented with the arrow icons 192 and 194.

As illustrated in FIG. 7, in a screen 200, the number of items of IT devices and services are displayed with respect to a memory usage (%).

As shown in FIG. 7, in the screen 200, information about the number of services of the monitoring targets, the average use rate, the maximum use rate, the update time, and the like may also be displayed.

Like FIG. 5, a bar graph 202 where the distribution is concentrated is different in the digit number in the order of the number of items from that of a bar graph 204 of which number of items is small. Accordingly, in the portion of the graph 202 where the digit number is large, gradation processing is applied to the lower portion, so that it is drawn in a blurred manner, whereby the user can recognize that the scale is different.

In this case, graphs 206 represent the number of items of the memory usage (%) equal to or more than a predetermined value. The emphasis display unit 106 displays, in the portion of the graphs 206 in an emphasized manner, the number of items of which memory usage are abnormal values. In FIG. 7, an upward arrow icon 210 indicates that the number of items representing the abnormal function response time is increasing.

The tendency of the change of the graph 202 is the same as that in FIG. 5, and may be presented with the arrow icons 212 and 214.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-197761 filed on Sep. 3, 2010, the disclosure of which is incorporated herein in its entirety by reference.

The invention claimed is:

1. A display processing system comprising:
a state display unit which displays a state of monitoring targets, said state of monitoring targets being displayed as a distribution of monitoring targets with respect to a value representing said state of the monitoring targets;
an emphasis display unit which emphasizes and displays, when there is a change in said state of the monitoring targets, a difference display portion indicating an amount of said change in said distribution of the monitoring targets, said difference display portion being enlarged so as to represent a value larger than an actual amount of said change; and
a display control unit which changes, after a predetermined period of time passes, the emphasized display by said emphasis display unit back to display of said state of monitoring targets by said state display unit,
wherein said state display unit displays, as a graph, the distribution of said monitoring targets with respect to the value indicated by said state of said monitoring targets with predetermined timing,
when said state of said monitoring target changes within said predetermined timing, said emphasis display unit uses a difference "x" of said change of said state of said monitoring targets between the previous and current timing to calculate a value for emphasized display in accordance with a predetermined function f(x) for increasing difference of said change, and uses the calculated value to emphasize and display, as difference of said change, said state of said monitoring targets of said previous timing, and
said display control unit gradually changes a portion of difference of the change emphasized and displayed back to display of said state of said monitoring targets, over said predetermined period of time.

2. The display processing system according to claim 1, wherein when the value indicated by the state of said monitoring targets is out of a normal range, said emphasis display unit displays with a higher degree of emphasis which is higher than that when the value indicated by the state of said monitoring targets is within the normal range.

3. The display processing system according to claim 1 further comprising a collection unit collecting the value indicated by the state of said monitoring targets through a network from another computer,
wherein said state display unit displays the value indicated by the state of said monitoring targets collected by said collection unit.

4. A display processing method to be executed by a processing apparatus having a display unit, the method comprising:
displaying a state of monitoring targets on said display unit, said state of monitoring targets being displayed as a distribution of monitoring targets with respect to a value representing said state of the monitoring targets;
when a state of said monitoring targets changes, emphasizing and displaying a difference display portion indicating an amount of the change in said distribution of the monitoring targets, said difference display portion being enlarged so as to represent a value larger than an actual amount of said change; and
after a predetermined period of time passes, changing the emphasized display back to display of said state of said monitoring targets,
wherein said displaying includes displaying, as a graph, the distribution of said monitoring targets with respect to the value indicated by said state of said monitoring targets with predetermined timing,
when said state of said monitoring target changes within said predetermined timing, said emphasized displaying uses a difference "x" of said change of said state of said monitoring targets between the previous and current timing to calculate a value for emphasized display in accordance with a predetermined function f(x) for increasing difference of said change, and using the calculated value to emphasize and display, as difference of said change, said state of said monitoring targets of said previous timing, and
gradually changing a portion of difference of the change emphasized and displayed back to display of said state of said monitoring targets, over said predetermined period of time.

5. A computer program product comprising a computer readable storage storing instructions enabling a computer system with a CPU to perform operations comprising:
displaying a state of monitoring targets on said display unit, said state of monitoring targets being displayed as a distribution of the monitoring targets with respect to a value representing said state of the monitoring targets;
when said state of said monitoring targets changes, emphasizing and displaying a difference display portion indicating an amount of said change in said distribution of the monitoring targets, said difference display portion being enlarged so as to represent a value larger than an actual amount of said change; and
after a predetermined period of time passes, changing the emphasized display back to display of said state of said monitoring targets,
wherein said displaying includes displaying, as a graph, the distribution of said monitoring targets with respect to the value indicated by said state of said monitoring targets with predetermined timing,
when said state of said monitoring target changes within said predetermined timing, said emphasized displaying uses a difference "x" of said change of said state of said monitoring targets between the previous and current timing to calculate a value for emphasized display in accordance with a predetermined function f(x) for increasing difference of said change, and using the calculated value to emphasize and display, as difference of said change, said state of said monitoring targets of said previous timing, and
gradually changing a portion of difference of the change emphasized and displayed back to display of said state of said monitoring targets, over said predetermined period of time.

6. A display processing system with a memory and a CPU comprising:
means for displaying a state of monitoring targets, said state of the monitoring targets being displayed as a distribution of monitoring targets with respect to a value representing said state of the monitoring targets;
means for emphasizing and displaying a difference display portion indicating an amount of change when there is the change in said state of said distribution of monitoring targets, said difference display portion being enlarged so as to represent a value larger than an actual amount of said change; and means for changing, after a predetermined period of time passes, the emphasized display back to display of said state of said monitoring targets, wherein said means for displaying includes means for displaying, as a graph, the distribution of said monitoring targets with respect to the value indicated by said state of said monitoring targets with predetermined timing, said means for emphasizing and displaying includes means for emphasizing and displaying, when said state of said monitoring target changes within said predetermined timing, using a difference "x" of said change of said state of said monitoring targets between the previous and current timing to calculate a value for emphasized display in accordance with a predetermined function $f(x)$ for increasing difference of said change, and using the calculated value to emphasize and display, as difference of said change, said state of said monitoring targets of said previous timing, and said means for displaying includes means for gradually changing a portion of difference of the change emphasized and displayed back to display of said state of said monitoring targets, over said predetermined period of time.

7. The display processing system according to claim 1, wherein said state display unit displays the distribution of the monitoring targets as a bar graph with respect to the value representing said state of monitoring targets, and said emphasis display unit emphasizes and displays, when there is a change in the distribution of said monitoring targets, by drawing the difference display portion in the bar graph so as to indicate a number larger than an actual number.

* * * * *